(12) United States Patent
Lin et al.

(10) Patent No.: US 6,644,548 B1
(45) Date of Patent: Nov. 11, 2003

(54) MOBILE DATA ACCESS APPARATUS

(75) Inventors: Yu-Fong Lin, Taoyuan (TW); David Chen, Miaoli (TW); Chien-An Chen, Hsinchu (TW)

(73) Assignee: Phison Electronic Corp., Hsinchu Hsien (TW)

( * ) Notice: Subject to any disclaimer, the term of this patent is extended or adjusted under 35 U.S.C. 154(b) by 0 days.

(21) Appl. No.: 10/212,874

(22) Filed: Aug. 7, 2002

(51) Int. Cl.[7] .................................................. G06K 7/08
(52) U.S. Cl. ....................... 235/451; 361/683; 361/686; 361/684; 455/344
(58) Field of Search ........................... 235/451; 361/683, 361/686, 684; 455/344

(56) References Cited

U.S. PATENT DOCUMENTS

| | | | | |
|---|---|---|---|---|
| 5,555,490 A | * | 9/1996 | Carroll | 361/686 |
| 5,572,401 A | * | 11/1996 | Carroll | 361/683 |
| 5,956,630 A | * | 9/1999 | Mackey | 455/344 |
| 6,507,486 B2 | * | 1/2003 | Peterson, III | 361/683 |

* cited by examiner

Primary Examiner—Thien M. Le
Assistant Examiner—Daniel A. Hess
(74) Attorney, Agent, or Firm—Rabin & Berdo, P.C.

(57) ABSTRACT

A mobile data access apparatus having a cable connected between an electronic apparatus for receiving and reading a memory card and a high-speed data bus connectable to a computer, and a data bus holder slidably mounted on the cable and adapted to hold the high-speed data bus and to let a part of the cable be arranged into a loop for enabling the mobile data access apparatus to be worn round the neck as an ornament.

16 Claims, 4 Drawing Sheets

MOBILE DATA ACCESS APPARATUS

BACKGROUND OF THE INVENTION

1. Field of the Invention

The present invention relates to a mobile data access apparatus and, more specifically, to such a mobile data access apparatus that can be arranged into a pendant for wearing round the neck as an ornament.

2. Description of the Related Art

A memory card is an important medium for use in mobile electronic apparatus for storing data. For example, digital cameras and MP3 players commonly use a memory card to store photos or music pieces. When reading data, for example, digital video data from the memory card of a mobile electronic apparatus, the user may have to connect the mobile electronic apparatus to a host computer. It is inconvenient to fetch data from the memory card of a mobile electronic apparatus in this manner.

SUMMARY OF THE INVENTION

The present invention has been accomplished under the circumstances in view. It is therefore the main object of the present invention to provide a mobile data access apparatus that can conveniently be connected to a computer for data access. It is another object of the present invention to provide a mobile data access apparatus that can be worn round the neck as an ornament. To achieve these and other objects of the present invention, the data access apparatus comprises an electronic apparatus adapted for receiving and reading a memory card, a high-speed data bus connectable to a computer, a cable connected between the electronic apparatus and the high-speed data bus, and a data bus holder slidably mounted on the cable and adapted to hold the high-speed data bus and to let a part of the cable be arranged into a loop for enabling the mobile data access apparatus to be worn round the neck as an ornament.

DETAILED DESCRIPTION OF THE PREFERRED EMBODIMENT

Figure 1:
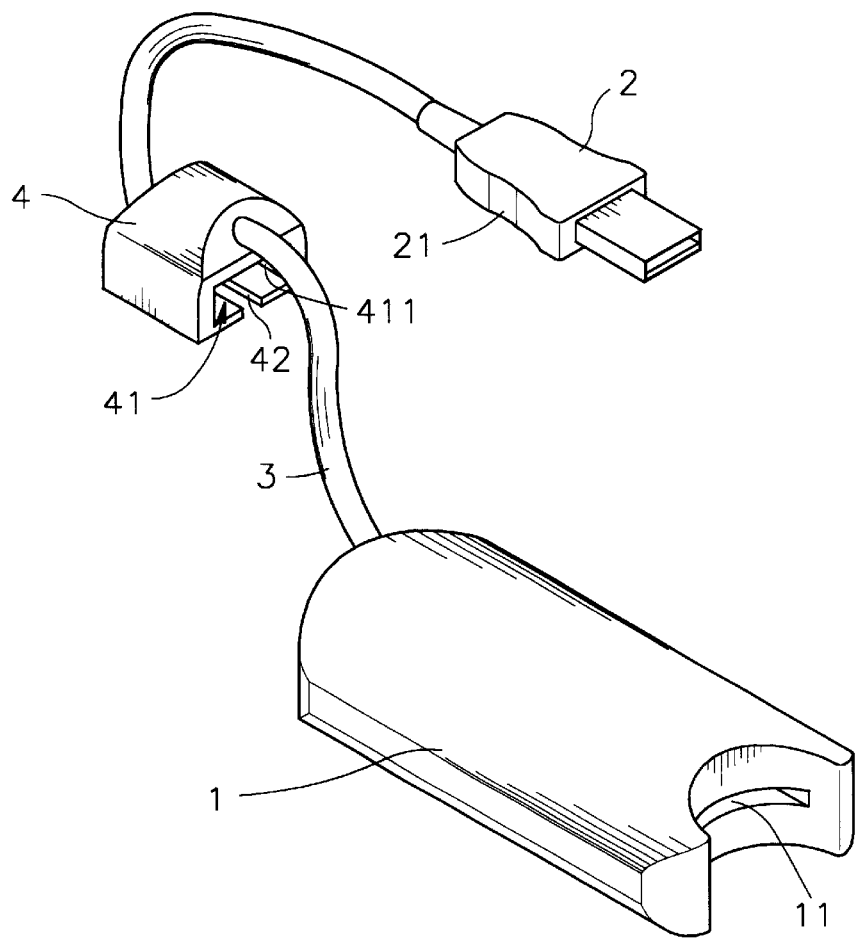
FIG. 1 is an elevational view of a mobile data access apparatus according to the first embodiment of the present invention.
Figure 2:
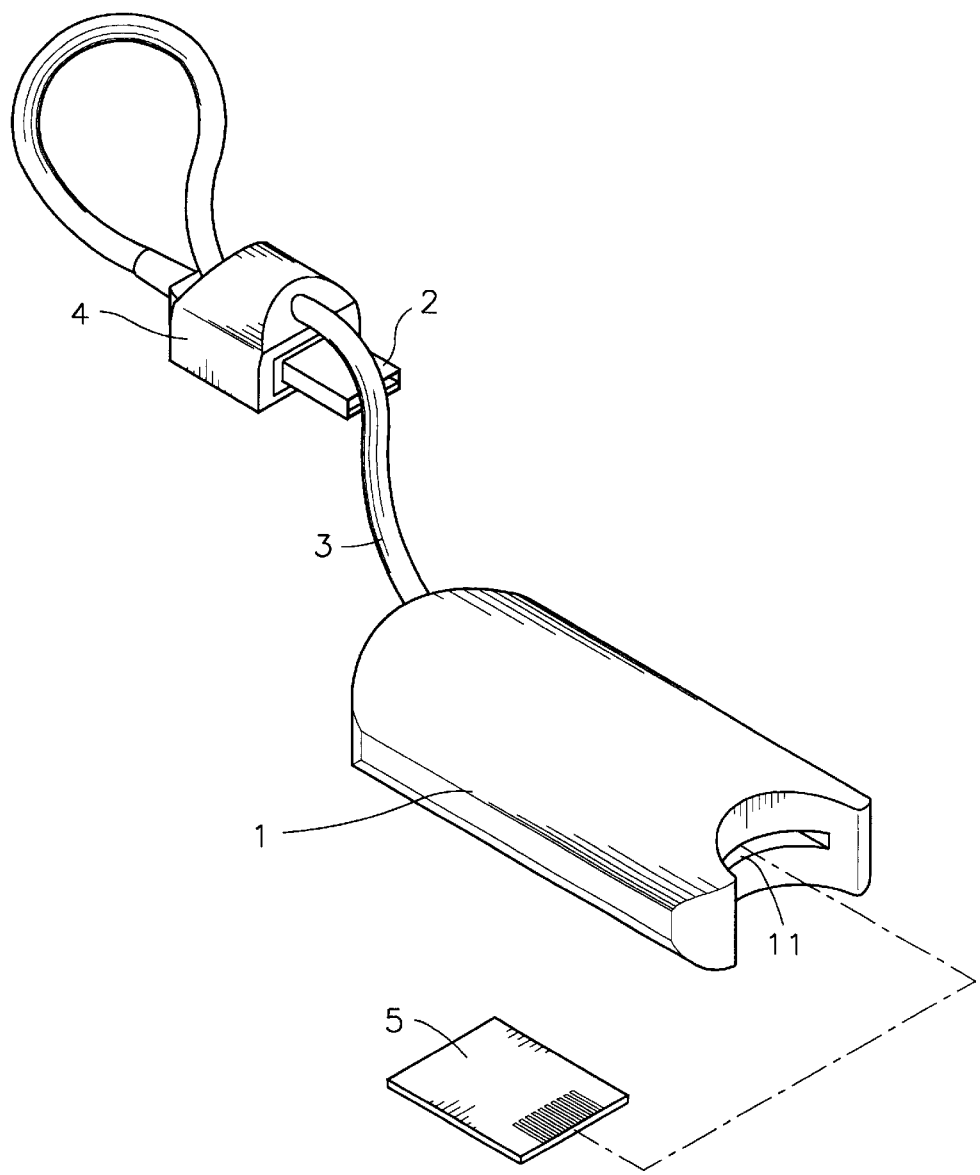
FIG. 2 illustrates the high-speed data bus fastened to the data bus holder according to the first embodiment of the present invention.

Referring to FIGS. 1 and 2, a mobile data access apparatus in accordance with the present invention is shown comprising an electronic device 1 connectable to a computer, a high-speed data bus 2 connectable to a computer, and a cable 3.

The electronic device 1 is connected to one end of the cable 3, having an insertion slot 11 adapted for receiving a memory card 5. The electronic device 1 can be a card reader, disk player, flash card reader, digital camera, MP3 player, etc. The memory card 5 can be a compact flash card, MMC card, smart memory card, secured digital memory card, CF card, etc.

The high-speed data bus 2 has two sloping guide faces 21 disposed at two opposite lateral sides. This high-speed data bus 2 can be a universal serial bus or 1394 bus.

The cable 3 is connected between the electronic apparatus 1 and the high-speed data bus 2, having a data bus holder 4 coupled thereto. The data bus holder 4 can be moved along the cable 3 between the electronic apparatus 1 and the high-speed data bus 2 to the desired position, having a receiving open chamber 41 extended through front and rear sides thereof and adapted for receiving the high-speed data bus 2, a tapered inside wall portion 411 in the receiving open chamber 41, and a longitudinal split 42 in the bottom side wall thereof in communication with the receiving open chamber 41. The presence of the longitudinal split 42 enables the receiving open chamber 41 to be slightly expanded.

Figure 3:
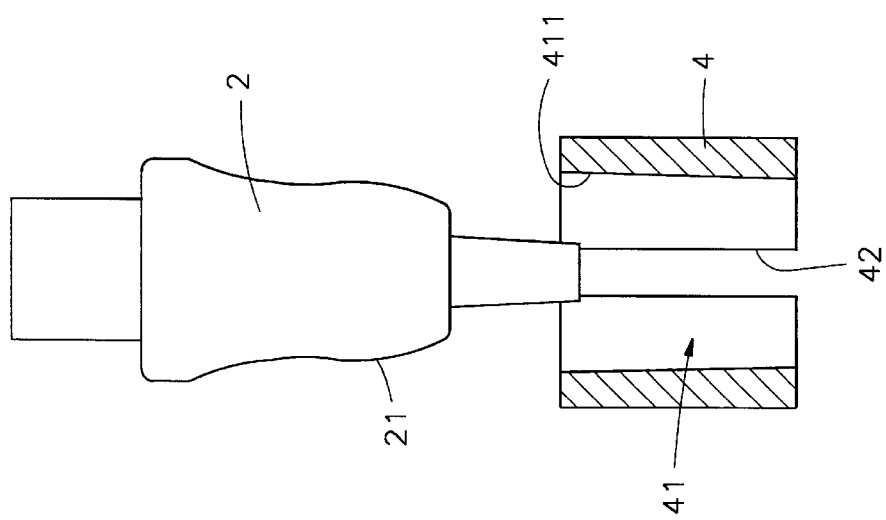
FIG. 3 is a sectional view showing insertion of the high-speed data bus into the data bus holder according to the first embodiment of the present invention.
Figure 4:
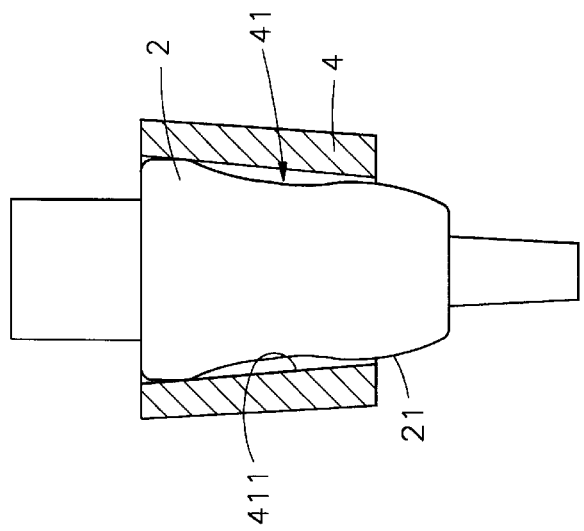
FIG. 4 is a sectional view showing the high-speed data bus fastened to the data bus holder according to the first embodiment of the present invention.

Referring to FIGS. 3 and 4 and FIG. 2 again, by means of the sloping guide faces 21, the high-speed data bus 2 can easily be inserted into the receiving open chamber 41 of the data bus holder 4 and peripherally stopped against the tapered inside wall portion 411. After insertion of the high-speed data bus 2 in the receiving open chamber 41 of the data bus holder 4, the high-speed data bus 2 is positively secured to the data bus holder 4, holding a part of the cable 3 in a loop-like shape convenient for wearing round the neck as an ornament.

Figure 6:
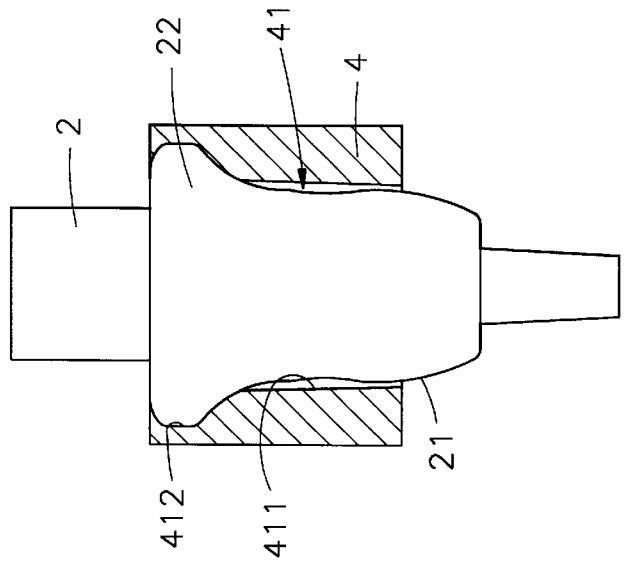
FIG. 6 is a sectional view showing the high-speed data bus fastened to the data bus holder according to the second embodiment of the present invention.
Figure 5:
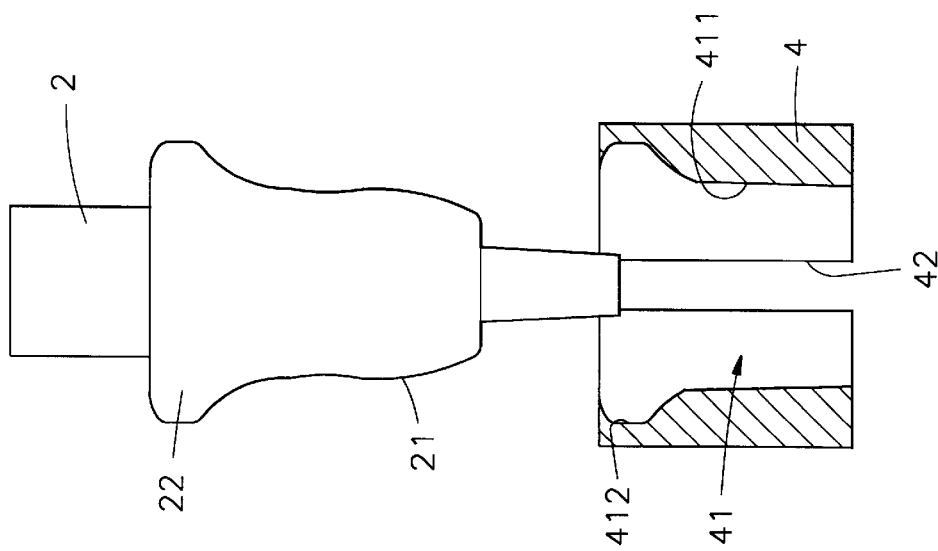
FIG. 5 is a sectional view showing insertion of the high-speed data bus into the data bus holder according to the second embodiment of the present invention.

FIGS. 5 and 6 show an alternate form of the present invention. According to this alternate form, the data bus holder 4 has a recessed retaining portion 412 in one end of the tapered inside wall portion 411 in the receiving open chamber 41, and the high-speed data bus 2 has a protruded positioning portion 22 in front of the sloping guide faces 21. When the high-speed data bus 2 inserted into the receiving open chamber 41 of the data bus holder 4, the protruded positioning portion 22 is forced into engagement with the recessed retaining portion 412, keeping the high-speed data bus 2 positively secured to the data bus holder 4.

A prototype of mobile data access apparatus has been constructed with the features of the annexed drawings of FIGS. 1~6. The mobile data access apparatus functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A mobile data access apparatus comprising:

an electronic apparatus adapted for receiving and reading a memory card;

a high-speed data bus connectable to a computer;

a cable connected between said electronic apparatus and said high-speed data bus; and a data bus holder mounted on said cable and movable along said cable between said electronic apparatus and said high-speed data bus and adapted to hold said high-speed data bus and to let a part of said cable be arranged into a loop for hanging, said data bus holder having a receiving open chamber extended through front and back sidewalls thereof for the positioning of said high-speed data bus.

2. The mobile data access apparatus as claimed in claim 1, wherein said high-speed data bus has two sloping guide faces disposed at two sides.

3. The mobile data access apparatus as claimed in claim 1, wherein said data bus holder has a tapered inside wall portion in said receiving open chamber.

4. The mobile data access apparatus as claimed in claim 1, wherein said data bus holder has a longitudinal split in a bottom sidewall thereof in communication with said receiving open chamber.

5. The mobile data access apparatus as claimed in claim 1, wherein said high-speed data bus has a protruded positioning portion; said data bus holder has a recessed retaining portion in one end of said receiving open chamber for receiving the protruded positioning portion of said high-speed data bus.

6. The mobile data access apparatus as claimed in claim 1, wherein said electronic apparatus has an insertion slot disposed in a front side thereof remote from said cable and adapted for receiving a memory card.

7. The mobile data access apparatus as claimed in claim 6, wherein said memory card is a MMC card.

8. The mobile data access apparatus as claimed in claim 6, wherein said memory card is a compact flash card.

9. The mobile data access apparatus as claimed in claim 6, wherein said memory card is a smart memory card.

10. The mobile data access apparatus as claimed in claim 6, wherein said memory card is a secured digital memory card.

11. The mobile data access apparatus as claimed in claim 1, wherein said high-speed data bus is a universal serial bus.

12. The mobile data access apparatus as claimed in claim 1, wherein said high-speed data bus is a 1394 bus.

13. The mobile data access apparatus as claimed in claim 1, wherein said electronic apparatus is a card reader.

14. The mobile data access apparatus as claimed in claim 1, wherein said electronic apparatus is a flash card reader.

15. The mobile data access apparatus as claimed in claim 1, wherein said electronic apparatus is a digital camera.

16. The mobile data access apparatus as claimed in claim 1, wherein said electronic apparatus is a MP3 player.

* * * * *